United States Patent [19]

Lewis

[11] Patent Number: 5,067,274

[45] Date of Patent: Nov. 26, 1991

[54] TOMATO IRRIGATION AND SUPPORT POLE

[76] Inventor: Richard L. Lewis, 4080 Hancock St. #3806, San Diego, Calif. 92110

[21] Appl. No.: 468,234

[22] Filed: Jan. 22, 1990

Related U.S. Application Data

[63] Continuation-in-part of Ser. No. 371,824, Jun. 27, 1989, abandoned.

[51] Int. Cl.⁵ .............................................. A01G 17/14
[52] U.S. Cl. ........................................ 47/47; 403/346
[58] Field of Search ..................................... 47/44–47; 403/347, 346

[56] References Cited

U.S. PATENT DOCUMENTS 3,345,774 10/1967 Delbuguet ............................... 47/44

FOREIGN PATENT DOCUMENTS

| 325531 | 7/1989 | European Pat. Off. | 47/47 |
| 2034448 | 1/1972 | Fed. Rep. of Germany | 47/46 |
| 2334909 | 1/1974 | Fed. Rep. of Germany | 47/47 |
| 3345805 | 6/1985 | Fed. Rep. of Germany | 47/46 |
| 2233928 | 1/1975 | France | 47/47 |
| 694133 | 10/1979 | U.S.S.R. | 47/47 |
| 663947 | 1/1952 | United Kingdom | 47/47 |
| 2098043 | 11/1982 | United Kingdom | 47/44 |

Primary Examiner—Henry E. Raduazo
Attorney, Agent, or Firm—Ralph S. Branscomb

[57] ABSTRACT

A tomato pole is provided having a plurality of spaced, V-shaped slanted slots entrant from one side thereof. The pole is hollow and can be driven into the ground, with one or more of the slots preferably being subterranean in use such that irrigation water can be poured into the top of the pole and will irrigate through the lower notches. The spaced notches enable the user to use anything available for transverse tomato plant support sticks.

1 Claim, 1 Drawing Sheet

U.S. Patent     Nov. 26, 1991     5,067,274
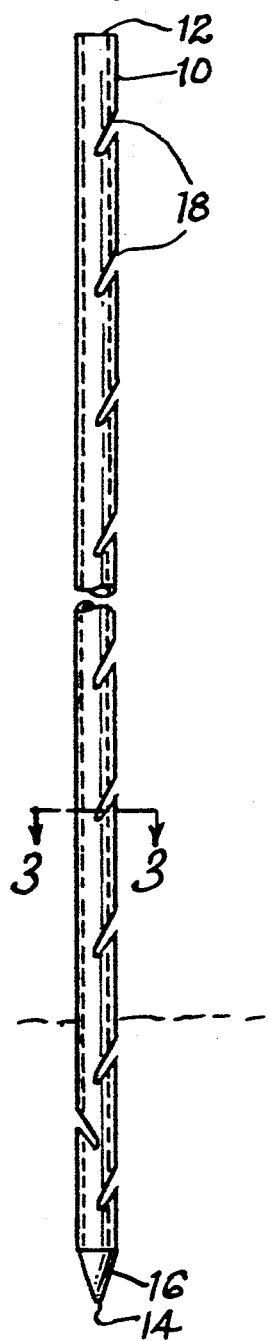
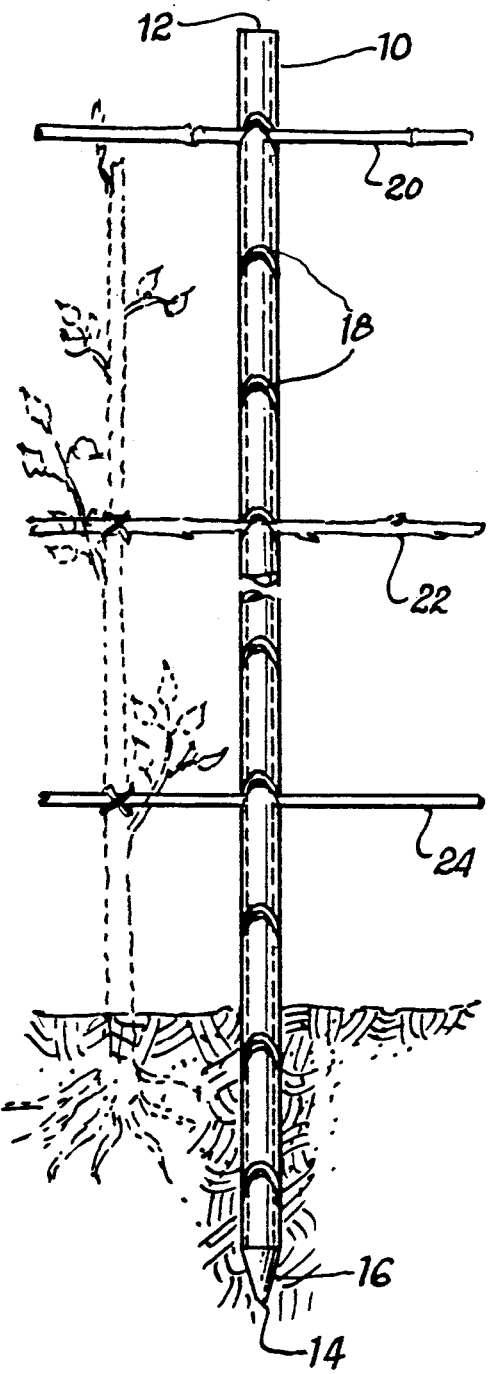
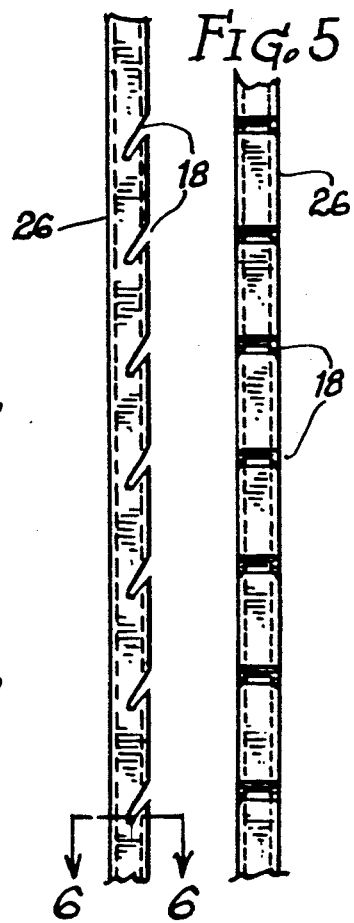
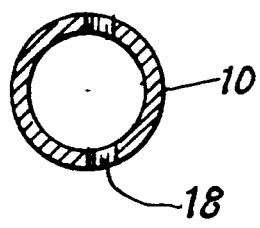
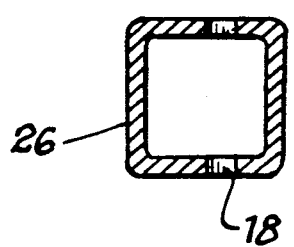

TOMATO IRRIGATION AND SUPPORT POLE

BACKGROUND OF THE INVENTION

This application is a Continuation-in-part of application 07/371,824 filed June 27, 1989 now abandoned.

Tomatoes are probably the favorite food gardening crop of gardeners in North America. Although they are relatively labor intensive compared to some other food crops, this is an asset to many home gardeners who enjoy puttering around in their garden. The tomato plant is very gratifying to the grower, inasmuch as if cared for properly in its growing and fruiting stages, it will produce many pounds of delicious tomatoes from a relatively small plant.

If left to its own devices, the weight of the tomatoes will easily bend the plant to the ground so that all of the tomatoes will lie on the ground. If allowed to do this, the tomatoes will soon rot and be eaten by worms and ground bugs. To prevent this, the plant must be tied up to hold the tomatoes suspended in the air. Ordinarily, this is done with a simple bamboo stick which is inserted in the ground, with the tomato plant being tied to various heights of the stick by cord or any other convenient binder.

Although it is true that many home tomato growers enjoy the ritual of growing the tomatoes and tying up the plants, nevertheless it can be tedious repeatedly tying the plant to a vertical bar as it continues to grow.

There is a need for a specially designed tomato stake which facilitates the tying of the tomato plants as they grow vertically, and also takes advantage of the fact that the stake is extended into the ground in the region of the tomato plant's roots and could be instrumental in irrigating the roots.

A number of these stakes have been developed as is evidenced by the following patents:
U.S. Pat. No. 4,021,965, issued May 10, 1977;
U.S. Pat. No. 3,165,863, issued Jan. 19, 1965;
U.S. Pat. No. 3,579,908, issued May 25, 1971;
U.S. Pat. No. 2,990,647, issued July 4, 1961;
U.S. Pat. No. 3,345,774, issued Oct. 18, 1967.

Whereas most stakes or poles have means for supporting transverse members in ladder-like fashion for tying the various heights of the tomato plant as it grows, those that do uniformly provide holes through the pole and anticipate using a certain size and type of stick or pole to pass through the opening. Even if these sticks are provided with the main pole, they will inevitably break and get lost, forcing the grower to search around to find replacements. A better design would accommodate sticks, poles, rods, and lengths of heavy wire, and anything else that might be lying around the premises of the grower.

SUMMARY OF THE INVENTION

The instant invention accommodates the above stated need by providing a stake having V-shaped notches spaced along the stake and entered in a downwardly direction such that a variety of shapes and sizes of sticks, rods and the like can be wedged securely into the notches. The pole may be made out of hollow PVC plastic tubing which is not only very strong and weather resistent, but is also cheap. A tapered point on the bottom enables a stake to be driven into the ground securely, with irrigation facilitated by the hollow, open-top tube. The main feature of the invention is its ability to seat a wide variety of sticks and rods.

DESCRIPTION OF THE DRAWINGS

FIG. 1 is a front elevation view of the pole in use illustrating a of cross members in place;
FIG. 2 is side elevation view of the pole of FIG. 1 as seen from the 1 side;
FIG. 3 is section taken along line 3—3 in FIG. 2;
FIG. 4 is a partial side elevation view of a variation of the pole which Is square in cross section;
FIG. 5 is a front elevation view of the pole in FIG. 4; and,
FIG. 6 is a section taken along line 6—6 of FIG. 4.

DETAILED DESCRIPTION OF THE PREFERRED EMBODIMENT

FIG. 1 illustrates the pole in use. It has a elongated member 10 which is hollow, having an open top 12 and a pointed lower end 14. The pointed end 14 is formed by a plug 16.

Spaced along the length of the elongated member 10 are a number of notches 18. As best shown in FIGS. 2 and 4, the notches are slanted downwardly at about 45 degrees from the horizontal, and are V-shaped. The sub-soil portion of the pole may have additional slots on the opposite side of the pole for improved irrigation. With this design, sticks and rods can be wedged into the notches with sufficient force to hold them against any weight that the tomato plant would apply to them.

As shown in FIG. 1, a bamboo stick 20 of the type often used for tomato stakes may be wedged into the notch, as can be a plant or tree branch 22, or manufactured item such as the dowel 24. If a stick happens to break, it does not present a problem, inasmuch as some kind of stick or rod may be found just about anywhere.

Water, or fertilizer, or fertilizer dissolved in water can be poured into the top of the pole and it will drain out through the sub-soil slots to irrigate and fertilize the tomato plant. The slots are less subject to clogging with rocks and the ingrowth of roots than holes, especially round holes, would be.

In FIG. 4, the elongated member 26 is square in cross section as indicated in FIG. 6. Otherwise, the construction is substantially identical to the first embodiment.

Thus, as has already been demonstrated in use, the pole accomplishes two functions in tomato growing that are closely related. First, it provides the advanced irrigation system whereby nutrient-laden water causes the plant to grow faster, larger and fuller.

Secondly, to accommodate this accelerated growth, the strong structure of the pole, coupled with the convenience of the V-shaped notches which will seat a variety of support sticks enables the grower to follow the plant up as it grows, adding sticks from just about anywhere to conveniently keep up with the thriving plant.

I claim:
1. A tomato growing pole comprising an elongated member having a pointed bottom end that is substantially tapered to a point to be driven into the soil and having a plurality of longitudinally spaced V-shaped notches entrant at an angle between orthogonally and parallely of said member, each notch converging substantially uniformly from its widest portion at the entrance into the side of said pole to its narrowest portion at the point of the notch furthest into the interior of the pole, with the narrowest portion of each notch being longitudinally displaced on said pole toward said bottom portion from said widest portion, such that when driven partially into the soil at said bottom end said notches can seat variously shaped and sized sticks and poles when wedged into respective ones of said notches, with the weight of the sticks and poles holding them in the notches due to the angular orientation of the notches to support a tomato plant.

\* \* \* \* \*